United States Patent [19]

Wolf et al.

[11] Patent Number: 5,269,398
[45] Date of Patent: Dec. 14, 1993

[54] LONGITUDINALLY ADJUSTABLE GAS SPRING AND ELEVATING MECHANISM WITH SUCH GAS SPRING

[75] Inventors: Herbert Wolf, Nürnberg; Adolf Gebhardt, Feucht; Ludwig Stadelmann, Altdorf, all of Fed. Rep. of Germany

[73] Assignee: Suspa Compart AG, Altdorf, Fed. Rep. of Germany

[21] Appl. No.: 762,982

[22] Filed: Sep. 20, 1991

[30] Foreign Application Priority Data

Sep. 25, 1990 [DE] Fed. Rep. of Germany ... 9013467[U]

[51] Int. Cl.⁵ .............................. A47C 3/30; A47B 9/10
[52] U.S. Cl. ............................... 188/300; 267/64.12; 248/161
[58] Field of Search ............... 188/321.11, 380; 267/64.12; 297/345; 248/161, 622, 631; 384/615, 617

[56] References Cited

U.S. PATENT DOCUMENTS

| | | | |
|---|---|---|---|
| 1,027,252 | 5/1912 | Isaacson | 384/615 X |
| 1,662,601 | 3/1928 | Demchuk | 384/617 |
| 3,127,217 | 3/1964 | Caplan | 297/345 X |
| 3,455,618 | 7/1969 | Wehner | 384/615 |
| 3,627,246 | 12/1971 | Widding et al. | 248/631 X |
| 3,656,593 | 4/1972 | Bauer | 188/300 |
| 3,711,054 | 1/1973 | Bauer | 248/562 |
| 4,720,068 | 1/1988 | Tornero | 248/631 X |
| 5,120,011 | 6/1992 | Mintgen et al. | 297/345 X |

FOREIGN PATENT DOCUMENTS 2148448 5/1985 United Kingdom ............ 267/64.12

*Primary Examiner*—Robert J. Oberleitner
*Assistant Examiner*—Josie A. Ballato
*Attorney, Agent, or Firm*—Browdy and Neimark

[57] ABSTRACT

An elevating mechanism for chairs, tables or the like has a guide tube for a gas spring. The guide tube has a bottom plate with an opening. In its section penetrating through the bottom plate the piston rod is provided with a necking on which a retaining ring is arranged.

6 Claims, 1 Drawing Sheet

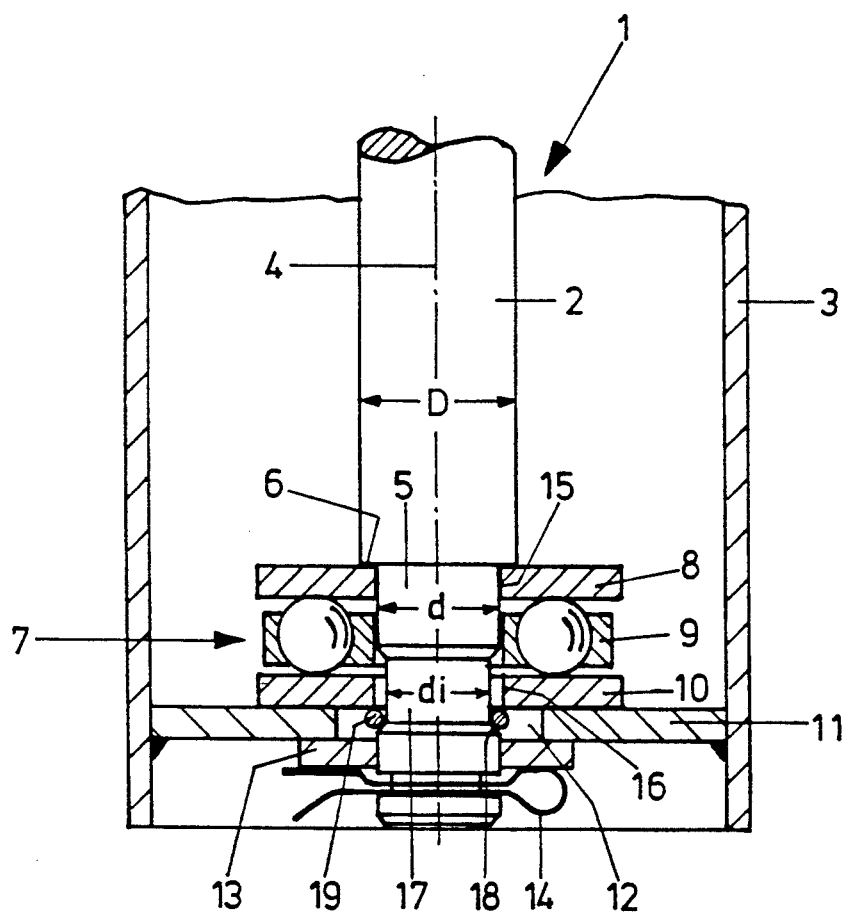

LONGITUDINALLY ADJUSTABLE GAS SPRING AND ELEVATING MECHANISM WITH SUCH GAS SPRING

FIELD OF THE INVENTION

The invention relates to a longitudinally adjustable gas spring for an elevating mechanism for chairs, tables or the like, having a guide tube for the gas spring, the guide tube having a bottom plate with an opening, a piston rod of the gas spring having a section, between which section and the piston rod is a collar and on which section an axial rolling bearing is arranged having a first disk and a second disk, of which the first disk located on the section with a centre opening bears against the said collar of the piston rod and of which the second disk arranged with a centre opening on the section can be put against the bottom plate, the section being such that it can penetrate through the opening of the bottom plate and can be axially arrested on the latter's side facing away from the axial rolling bearing by means of a locking device, and the diameter of the opening being greater than the diameter of the section in this area. The invention further relates to an elevating mechanism with such gas spring.

BACKGROUND OF THE INVENTION

Gas springs of the generic type are known from U.S. Pat. No. 3,656,593. Elevating mechanisms for chairs, tables and the like assembled by using such longitudinally adjustable gas springs are for instance known from U.S. Pat. No. 3,711,054. U.S. Pat. No. 4,979,718 discloses to encase the housing of the gas spring itself in an additional suspension tube and to guide the latter for displacement in the guide tube of the elevating mechanism. In such gas springs the familiar problem occurs that the piston rods do not extend in absolute alignment with the axis of the housing or the additional suspension tube. The guide bushes usually arranged in the guide tubes can increase such misaligments so that the free end of the piston rod fixed in a bottom plate of the guide tube clearly deviates from the central axis of the guide tube, which should actually coincide with the central axis of the gas spring. As a result of these misalignments the free end of the piston rod held in the bottom plate of the guide tube moves at right angles to the bottom plate during entering or exiting movements of the gas spring. The disks of the axial rolling bearing make clicking noises when this rolling bearing is moved to and fro on the bottom plate of the guide tube.

SUMMARY OF THE INVENTION

It is the object of the invention to embody the gas spring of the generic kind and the elevating mechanism of the generic kind such that such noises are reliably avoided and that simultaneously the expenditure required to this effect is as low as possible.

In accordance with the invention this object is attained in that the section of the piston rod located in the vicinity of the second disk bearing against the bottom plate is provided with a necking, and in that the centre openings of the disks have the same diameter. The measures according to the invention ensure that the lower disk resting against the bottom plate does no longer make any movements relative to the bottom plate even in the case of the described lateral movements of the free end of the piston rod, so that the clicking noises are avoided. The embodiment according to the invention, namely the necking on the section of the piston rod, serves to achieve that both disks of the axial rolling bearing can be identical and in particular also have identical centre openings. In particular, there is no need for different disks to be used, which would give rise to considerable storage problems, since the longitudinally adjustable gas spring is very often dispatched without the axial rolling bearing pre-assembled on the section of the piston rod. But the measures according to the invention still have an additional advantage, because according to advantageous embodiments they can be used to pre-assemble the axial rolling bearing on the section of the piston rod by arranging a retaining ring on a shoulder of the necking.

Further features, advantages and details of the invention will become apparent from the ensuing description of an example of embodiment taken in conjunction with the drawing.

BRIEF DESCRIPTION OF THE DRAWING

The drawing shows a longitudinal section of a part of an elevating mechanism for chairs, tables or the like.

DESCRIPTION OF THE PREFERRED EMBODIMENT

Of a longitudinally adjustable gas spring 1 only a piston rod 2 is illustrated. Such longitudinally adjustable gas springs are generally known, for instance from U.S. Pat. No. 3,656,593. This longitudinally adjustable gas spring 1, of which the housing is not shown, is displaceable in a guide tube 3 in the direction of the common central longitudinal axis 4, while its piston rod 2 is substantially axially arrested in this guide tube 3. Such elevating mechanisms comprising a gas spring 1 and a guide tube 3, in particular for chairs, but also for tables and the like, are also generally known, for instance from U.S. Pat. No. 3,711,054. Special reference is made to both afore-mentioned U.S. patents.

At its free end the piston rod 2 has a section 5, of which the diameter d is smaller than the diameter D of the piston rod 2. Thus a collar 6 is formed at the transition of the piston rod 2 to the section 5.

An axial rolling bearing 7, namely a thrust ball bearing, is arranged on the section 5. It has an upper disk 8, which axially rests against the collar 6 and is thus arrested. A ball cage 9 bears against this upper disk 8 and is in turn followed by a lower disk 10. This lower disk 10 is supported on a bottom plate 11 of the guide tube 3. An opening 12 is provided in the bottom plate 11 coaxially in relation to the axis 4 and has a diameter greater than the diameter D of the piston rod 2. The section 5 extends through this opening and is held on the lower side of the bottom plate 11 facing away from the rolling bearing 7 by means of a shim 13 and a locking device 14. The piston rod 2 of the gas spring 1 is thus arrested in axially non-displaceable manner relative to the guide tube 3. The two disks 8, 10 each have a centre opening 15 and 16, respectively, of identical diameter approximately corresponding to the diameter d of the section 5. As a result, the upper disk 8 resting against the collar 6 is arranged almost free of clearance on the section 5. Where the lower disk 10 rests against the bottom plate 11 the section 5 has a necking 17, of which the diameter di is smaller than the diameter d of the section 5. This necking 17 extends in the direction of the axis 4 over the full axial length of the lower disk 10 and even slightly beyond it. Here this necking 17 again passes via a shoulder 18 into the part of the section 5 associated with the free end of the piston rod 2. A retaining ring 19 of rubber, plastic or also of metal is arranged on this shoulder 18 and bears against the facing side of the lower disk 10. The outside diameter of this retaining ring 19 is smaller than the diameter of the opening 12 of the bottom plate 11. By means of this retaining ring 19 the axial rolling bearing 7 is pre-assembled on the piston rod 2, thus not getting lost upon assembly of the gas spring 1 in the guide tube 3. Rather, the free end of the section 5 only has to be pushed through the opening 12 and the shim 13 and the locking device 14 only have to be attached to complete the assembly of the gas spring 1 and the guide tube 3.

What is claimed is:

1. A longitudinally adjustable gas spring for an elevating mechanism for chairs, tables or the like, having a guide tube (3) for the gas spring (1), the guide tube (3) having a bottom plate (11) with an opening (12), a piston rod (2) of the gas spring having a section (5) extending therefrom, between which section (5) and on the piston rod (2) is a collar (6) and on which section (5) an axial rolling bearing (7) is arranged having a first disk (8), a second disk (10) and a ball cage (9), being held between said first and second disks (8, 10), of which axial rolling bearing (7) the first disk (8) located substantially free of clearance on the section (5) with a centre opening (15) bears against the said collar (6) of the piston rod (2) and of which the second disk (10) arranged with a centre opening (16) on the section (5) can be put against the bottom plate (11), the section (5) being such that it can penetrate through the opening (12) of the bottom plate (11) and can be axially arrested on the latter's side facing away from the axial rolling bearing (7) by means of a locking device (14), and the diameter of the opening (12) of the bottom plate being greater than the diameter (d) of the section (5), wherein the section (5) on the piston rod (2) located in the vicinity of the second disk (10) to be put against the bottom plate (11) is provided with a necking (17), wherein the centre openings (15, 16) of the disks (8, 10) have the same diameter;

wherein the necking (17) extends in the direction of an axis (4) of said piston rod (2) over the full axial length of the second disk (10) and in the direction towards a free end of the section (5) beyond the second disk (10), where the necking (17) has a shoulder (18), wherein a retaining ring (19) axially arresting the axial rolling bearing (7) to bear against the collar (6) is arranged on the shoulder (18), wherein the retaining ring consists of rubber, elastic plastic or metal and wherein the outside diameter of the retaining ring (19) is smaller than the diameter of the opening (12) of the bottom plate (11).

2. A gas spring according to claim 1, wherein the retaining ring (19) permits the lateral movement of the free end of the section (5) in relation to the second disk (10).

3. A gas spring according to claim 1, wherein the retaining ring (19) lies within opening (12) of the bottom plate (11).

4. An elevating mechanism for chairs, tables or the like, with a longitudinally adjustable gas spring, comprising:

a guide tube (3) for the gas spring (1), the guide tube (3) having a bottom plate (11) with an opening (12);

a piston rod (2) of the gas spring having a section (5) extending therefrom, between which section (5) and on said piston rod (2) is a collar (6);

an axial rolling bearing (7) having a first disk (8), a second disk (10) and a ball cage (9), being held between said first and second disks (8, 10) of which axially rolling bearing (7) the first disk (8) located substantially free of clearance on the section (5) with a centre opening (15) bears against the said collar (6) of the piston rod (2) and of which the second disk (10) arranged with a centre opening (16) on the section (5) bears against the bottom plate (11), the section (5) penetrating through the opening (12) of the bottom plate (11) and being axially arrested on the side of the bottom plate (11) facing away from the axial rolling bearing (7) by means of a locking device (14), and the diameter of the opening (12) of the bottom plate being greater than the diameter (d) of the section (5), wherein the section (5) on the piston rod (2) located in the vicinity of the second disk (10) bearing against the bottom plate (11) is provided with a necking (17), wherein the centre openings (15, 16) of the disks (8, 10) have the same diameter;

wherein the necking (17) extends in the direction of an axis (4) of said piston rod (2) over the full axial length of the second disk (10) and in the direction towards a free end of the section (5) beyond the second disk (10), where the necking (17) has a shoulder (18), wherein a retaining ring (19) axially arresting the axial rolling bearing (7) to bear against the collar (6) is arranged on the shoulder (18), wherein the retaining ring consists of rubber, elastic plastic or metal and wherein the outside diameter of the retaining ring (19) is smaller than the diameter of the opening (12) of the bottom plate (11).

5. A gas spring according to claim 4, wherein the retaining ring (19) permits the lateral movement of the free end of the section (5) in relation to the second disk (10).

6. A gas spring according to claim 4, wherein the retaining ring (19) lies within opening (12) of the bottom plate (11).

* * * * *